US008068969B2

(12) United States Patent
Juricak et al.

(10) Patent No.: US 8,068,969 B2
(45) Date of Patent: Nov. 29, 2011

(54) POWER DISTRIBUTION SYSTEM

(75) Inventors: Steven James Juricak, Yorkville, IL (US); Milton Carter Hubbard, Naperville, IL (US)

(73) Assignee: Caterpillar Inc., Peoria, IL (US)

( * ) Notice: Subject to any disclaimer, the term of this patent is extended or adjusted under 35 U.S.C. 154(b) by 691 days.

(21) Appl. No.: 11/987,512

(22) Filed: Nov. 30, 2007

(65) Prior Publication Data
US 2009/0143922 A1 Jun. 4, 2009

(51) Int. Cl.
*F16H 61/46* (2010.01)
*F16H 61/4026* (2010.01)
*F16H 39/06* (2010.01)
*F16H 61/42* (2010.01)
*F16H 13/00* (2006.01)

(52) U.S. Cl. .............. 701/99; 180/306; 60/422; 701/50
(58) Field of Classification Search .................. 701/50, 701/99, 100; 60/442; 180/306
See application file for complete search history.

(56) References Cited

U.S. PATENT DOCUMENTS

| | | | |
|---|---|---|---|
| 3,543,516 A | 12/1970 | Treichel | |
| 3,628,558 A * | 12/1971 | Bahl | 137/115.04 |
| 4,738,104 A * | 4/1988 | Hahmann et al. | 60/431 |
| 5,167,121 A * | 12/1992 | Sepehri et al. | 60/422 |
| 5,201,803 A | 4/1993 | Goto et al. | |
| 5,214,916 A * | 6/1993 | Lukich | 60/431 |
| 5,446,979 A * | 9/1995 | Sugiyama et al. | 37/348 |
| 5,471,908 A * | 12/1995 | Lech | 91/516 |
| 5,553,452 A | 9/1996 | Snow et al. | |
| 5,590,731 A * | 1/1997 | Jacobson | 180/53.4 |
| 5,930,996 A | 8/1999 | Nakamura et al. | |
| 6,094,617 A | 7/2000 | Lapke | |
| 6,109,385 A * | 8/2000 | Deininger et al. | 180/306 |
| 6,314,727 B1 * | 11/2001 | Prabhu et al. | 60/431 |
| 6,321,152 B1 * | 11/2001 | Amborski et al. | 701/50 |
| 6,427,107 B1 | 7/2002 | Chiu et al. | |
| 6,498,973 B2 * | 12/2002 | Dix et al. | 701/50 |
| 6,718,214 B1 * | 4/2004 | Schoettle et al. | 700/28 |
| 6,769,348 B2 * | 8/2004 | Hudson et al. | 91/516 |
| 6,772,060 B2 | 8/2004 | McCauley et al. | |
| 6,807,470 B2 | 10/2004 | Hara | |
| 6,842,689 B2 | 1/2005 | Andres et al. | |
| 6,892,128 B2 | 5/2005 | Asakawa et al. | |
| 6,920,387 B2 | 7/2005 | Landes et al. | |
| 7,146,263 B2 * | 12/2006 | Guven et al. | 701/54 |
| 7,146,808 B2 * | 12/2006 | Devier et al. | 60/422 |
| 7,155,907 B2 * | 1/2007 | Desjardins et al. | 60/420 |
| 7,277,782 B2 | 10/2007 | Yakes et al. | |
| 7,281,595 B2 * | 10/2007 | Bissontz | 180/65.28 |
| 7,322,800 B2 * | 1/2008 | Roth | 417/364 |

(Continued)

*Primary Examiner* — Mark Hellner
*Assistant Examiner* — Ari M Diacou
(74) *Attorney, Agent, or Firm* — Finnegan, Henderson, Farabow, Garrett & Dunner LLP

(57) ABSTRACT

A power distribution system is provided having a power source configured to generate a power output. The power distribution system also has an available power module configured to determine a total available power generated by the power source. In addition, the power distribution system has one or more parasitic power request modules configured to receive a request for power from an associated parasitic device and one or more non-parasitic power request modules configured to receive a request for power from an associated non-parasitic device. The power distribution system further has a power distribution module configured to cause the distribution of power among the parasitic and non-parasitic devices. The power distributed among the non-parasitic devices is the power remaining after the parasitic devices receive their requested power.

17 Claims, 3 Drawing Sheets

U.S. PATENT DOCUMENTS

| | | | |
|---|---|---|---|
| 7,412,315 B2 * | 8/2008 | Wildey et al. | 701/41 |
| 7,552,712 B1 * | 6/2009 | Barngrover et al. | 123/352 |
| 7,641,018 B2 * | 1/2010 | Bissontz | 180/306 |
| 2007/0005205 A1 | 1/2007 | Bernardi et al. | |
| 2008/0300757 A1 * | 12/2008 | Kanayama et al. | 701/50 |
| 2009/0044993 A1 * | 2/2009 | Bissontz | 180/65.2 |
| 2009/0112412 A1 * | 4/2009 | Cawthorne et al. | 701/54 |

* cited by examiner

POWER DISTRIBUTION SYSTEM

TECHNICAL FIELD

This disclosure relates generally to a power distribution system and, more particularly, to a power distribution system for a machine.

BACKGROUND

Mobile and stationary machines may include a power source for generating power. The power source may be any type of suitable energy generating device such as, for example, an engine or a generator. The mobile and stationary machines may also include powered devices that may use power generated or otherwise supplied by the power source. Such powered devices may include, for example, elements of a drive train for propelling the machine, one or more implements (e.g. an excavating tool), and parasitic devices (e.g. an air conditioning compressor, an axle oil cooler pump, etc.). At times, power requests from the powered devices may conflict because the power source may not be capable of fulfilling each and every power request.

If power requested by the powered devices exceeds the available power from the power source, some or all of the powered devices may not receive sufficient power, and/or the power source may stall or fail. Power source failures may result in machine downtime and decreased efficiency. Intelligently distributing power to different parts of the machine may help to reduce power source failures. In addition, intelligently distributing power from the power source to the powered devices may involve deciding which powered devices will receive power and how much power they will receive.

Existing power distribution systems do not consider the parasitic devices when determining the distribution of power from the power source. Such parasitic devices may be necessary for the adequate function and control of the drive train elements and implements and may draw power from the power source when the drive train elements and implements are operating. Because the existing power distribution systems do not consider the parasitic devices when determining the power distribution, the power actually consumed by the powered devices may still exceed the available power from the power source.

One attempt to consider parasitic devices when intelligently distributing power from the power source can be found in U.S. Pat. No. 6,842,689 (the '689 patent) issued to Andres et al. on Jan. 11, 2005. The '689 patent discloses a power system that supplies power to a plurality of power consuming devices. The power system includes an engine, a main power recipient (i.e., a transmission) and a plurality of parasitic devices. The system determines a gross power value which is equivalent to the total power demanded by the main power recipient and the parasitic devices. If the gross power exceeds current demand, the speed of the engine may be increased, thereby producing more power.

While the distribution system of the '689 patent may consider the parasitic devices when determining how to distribute power from the engine, the benefits of such distribution might be limited. In particular, by increasing the engine speed to resolve the power deficit, the engine may be operated at speeds that may be sub-optimal. In addition, if the engine is already generating the maximum power possible, increasing the engine speed may not be able to adequately power all of the powered devices.

The disclosed system is directed to overcoming one or more of the problems set forth above.

SUMMARY

In one aspect, the present disclosure is directed toward a power distribution system including a power source configured to generate a power output. The power distribution system also includes an available power module configured to determine a total available power generated by the power source. In addition, the power distribution system includes one or more parasitic power request modules configured to receive a request for power from an associated parasitic device and one or more non-parasitic power request modules configured to receive a request for power from an associated non-parasitic device. The power distribution system further includes a power distribution module configured to cause the distribution of power among the parasitic and non-parasitic devices. The power distributed among the non-parasitic devices is the power remaining after the parasitic devices receive their requested power.

Consistent with a further aspect of the disclosure, a method is provided for distributing power. The method includes receiving one or more parasitic power requests, each request being associated with a parasitic device. The method also includes receiving one or more non-parasitic power requests, each request being associated with a non-parasitic device. In addition, the method includes distributing available power among the parasitic devices. The method further includes distributing, to the non-parasitic devices, the power remaining.

DETAILED DESCRIPTION

Figure 1:
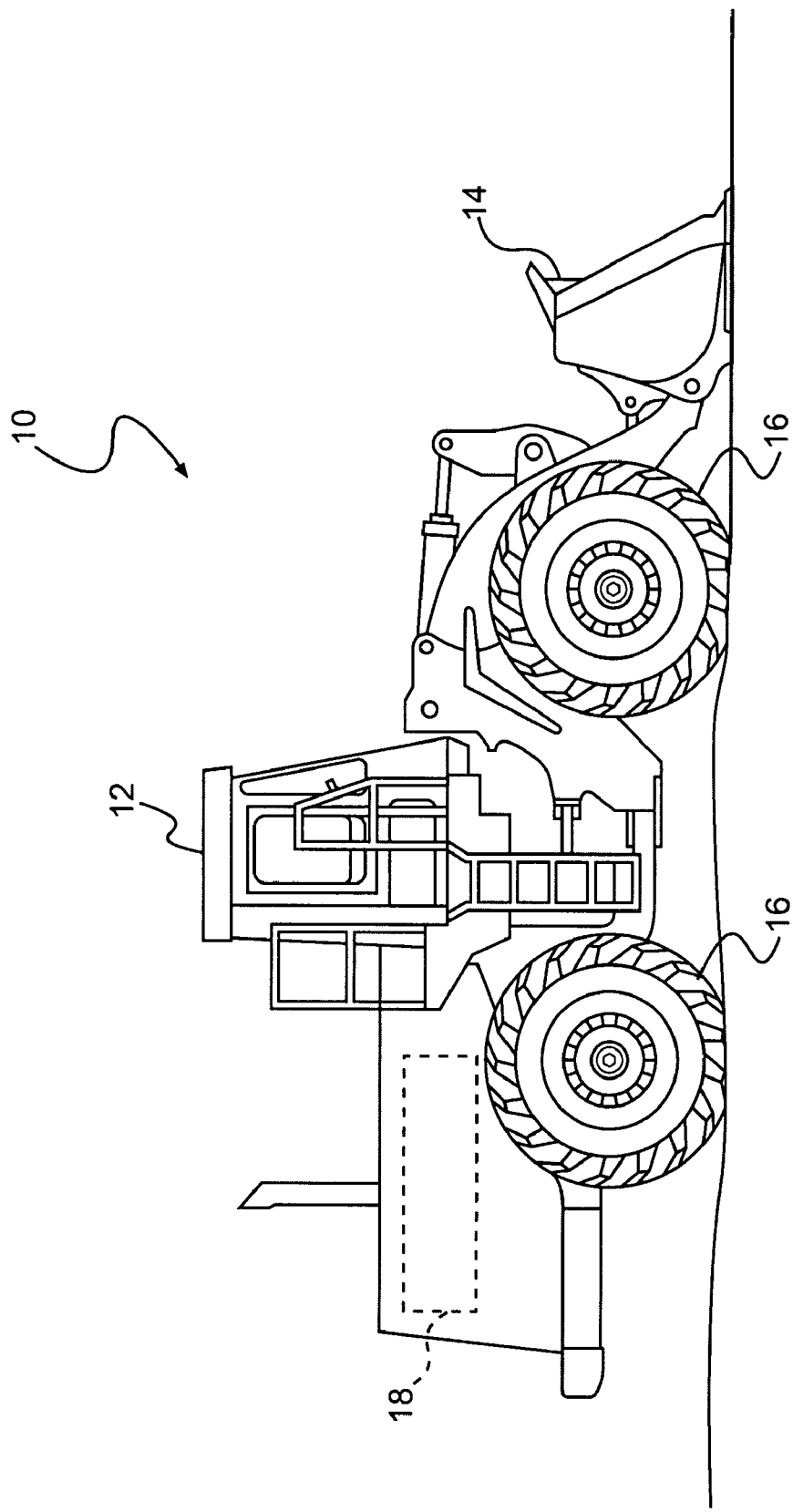
FIG. 1 is an illustration of an exemplary machine.

FIG. 1 illustrates an exemplary machine 10 having multiple systems and components that cooperate to accomplish a task. The tasks performed by machine 10 may be associated with a particular industry such as mining, construction, farming, transportation, power generation, or any other industry known in the art. For example, machine 10 may embody a mobile machine such as the wheel loader depicted in FIG. 1, a bus, a highway haul truck, or any other type of mobile machine known in the art. Machine 10 may include an operator station 12, an implement 14, and one or more traction devices 16.

Operator station 12 may house a machine operator and may include devices that receive input from the operator indicative of a desired machine travel maneuver. Specifically, operator station 12 may include one or more operator interface devices (not shown) located proximate an operator seat (not shown). The operator interface devices may initiate and/or regulate movement of machine 10 by producing signals that are indicative of a desired machine maneuver.

Implement 14 may include any device used to perform a particular task. For example, implement 14 may include a bucket, a fork arrangement, a blade, a shovel, a ripper, a dump bed, a broom, a snow blower, a propelling device, a cutting device, a grasping device, or any other task-performing device known in the art. Implement 14 may be connected to machine 10 via a direct pivot, via a linkage system, via one or more hydraulic cylinders, or in any other appropriate manner. Implement 14 may be configured to pivot, rotate, slide, swing, lift, or move relative to machine 10 in any manner known in the art.

Traction devices 16 may embody wheels located on each side of machine 10 (only one side shown). Alternatively, traction devices 16 may include tracks, belts or other known traction devices. It is contemplated that any combination of the wheels on machine 10 may be driven and/or steered.

Figure 2:
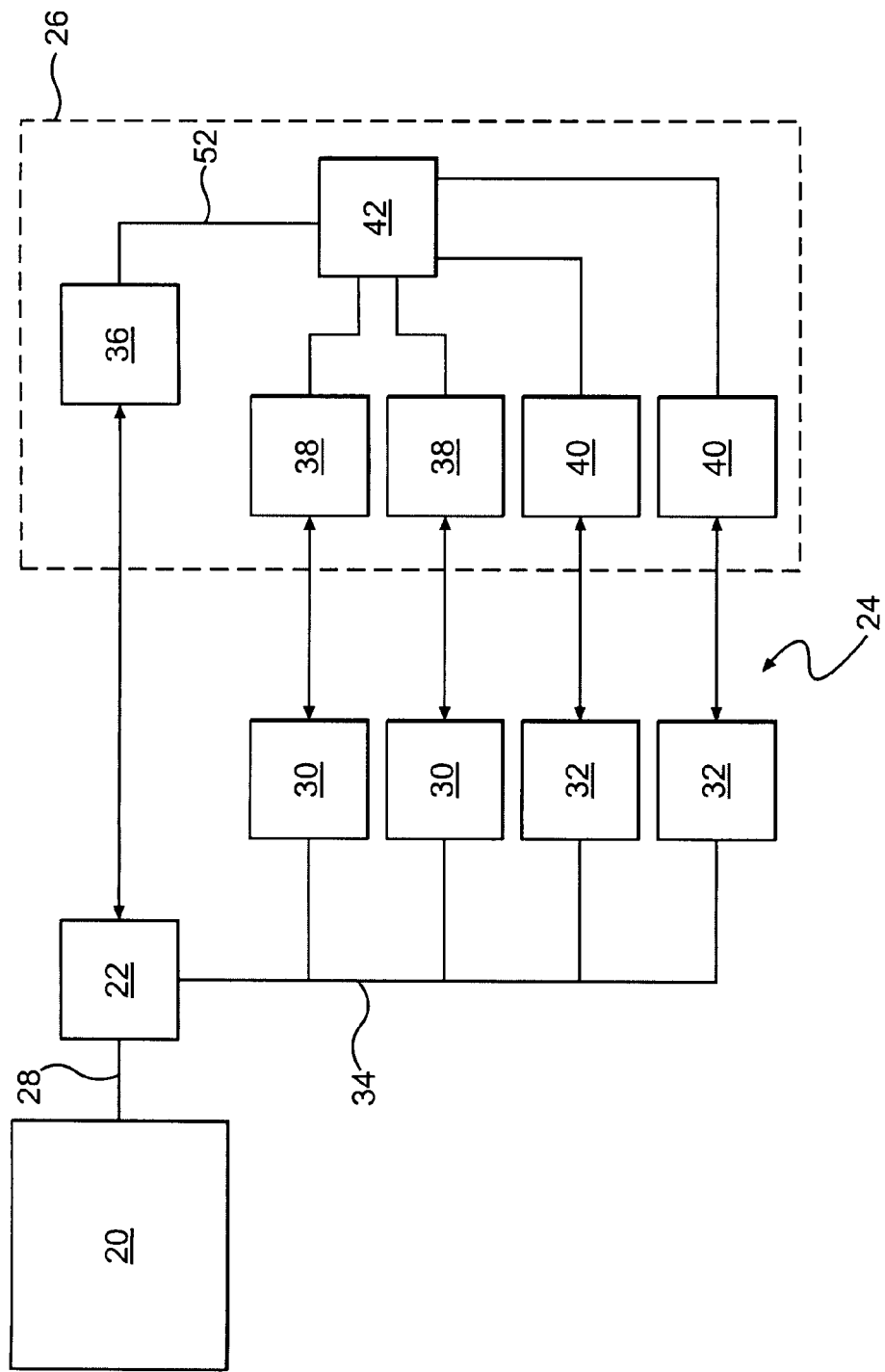
FIG. 2 is a block-level schematic of a power management system for use with the exemplary machine of FIG. 1.

As shown in the schematic diagram of FIG. 2, machine 10 may also include a power management system 18 for distributing power among various systems of machine 10. Power management system 18 may include a power source 20, a power converting device 22, one or more power consuming devices 24, and a control system 26 for regulating the operation of power transforming device 22 in response to the demands of power consuming devices 24.

Power source 20 may include an internal combustion engine having multiple subsystems that cooperate to produce a mechanical or electrical power output. In addition, power source 20 may be any type of internal combustion engine such as, for example, a diesel, gasoline, or gaseous fuel-powered engine. It should be understood that the maximum amount of power that power source 20 may be able to generate may depend on its speed. For example, the power generating capacity of power source 20 may increase as the speed of power source 20 increases.

Power converting device 22 may be any device capable of converting at least a portion of a power output of power source 20 to a form that may be consumed by power consuming devices 24. For example, power converting device 22 may be an A/C or D/C generator. In addition, power converting device 22 may be operatively coupled to power source 20 via a crankshaft 28, or in any other manner known in the art.

Power consuming devices 24 may include any type of device or system of machine 10 that may consume the power generated by power source 20 such as, for example, parasitic devices 30 and non-parasitic devices 32. It should be understood that although FIG. 2 illustrates two parasitic devices 30 and two non-parasitic devices 32, power management system 18 may include any number of parasitic and non-parasitic devices 30 and 32, as desired. In addition, power consuming devices 24 may receive the converted power from power converting device 22 via power lines 34 and may use the generated power to perform predetermined operations. It is contemplated that some or all non-parasitic devices 32 may receive power from power source 20 via crankshaft 28. Parasitic devices 30 may include, for example, a compressor for an air conditioning unit, an axle oil cooler, an alternator, a transmission pump, an emissions driven compressor, or any other parasitic device. Furthermore, non-parasitic devices 32 may include, for example, non-parasitic elements of a power train, implement 14, or any other non-parasitic device.

Control system 26 may take any form such as, for example, a computer based system, a microprocessor based system, a microcontroller, or any other suitable control type circuit or system. In addition, control system 26 may be located anywhere within machine 10 and may include various components for running software applications designed to distribute power generated by power source 20 among power consuming devices 24. For example, control system 26 may include a central processing unit (CPU), a random access memory (RAM), input/output (I/O) elements, etc. Furthermore, control system 26 may include an available power module 36, one or more parasitic power request modules 38, one or more non-parasitic power request modules 40, and a power distribution module 42.

Available power module 36 may obtain power source related inputs, including, for example, signals indicative of power source operating conditions, torque, power, capacity, and/or speed. The signals may be obtained from one or more sensors (not shown) monitoring power source 20. Available power module 36 may use the power source related inputs to determine the total power that power source 20 may produce in an operating state. It should be understood that the total power that power source 20 may be capable of producing at any given time may depend on such factors as machine altitude, fuel quality, and/or power source speed. Upon receiving the power source data from the one or more sensors, available power module 36 may generate a signal indicative of the total available power from power source 20.

Each parasitic power request module 38 may be associated with and obtain inputs related to a corresponding parasitic device 30. Such inputs may include, for example, pressures, flow rates, current power usage, and/or expected power usage. In addition, the inputs may be in the form of signals generated by one or more sensors (not shown) monitoring each parasitic device 30, machine 10, and/or an external object, such as a hole or pile. Such signals may also be generated by a machine operator. For example, signals may be generated as an operator operates a control device (not shown), such as a joystick, steering wheel, or accelerator pedal in cab 12, to move implement 14, traction devices 16, and/or machine 10. Based on the inputs, each parasitic power request module 38 may generate a power request for the associated parasitic device 30.

Each non-parasitic power request module 40 may be associated with and obtain inputs related to a corresponding non-parasitic device 32. Such inputs may include, for example, pressures, flow rates, current power usage, and/or expected power usage. The inputs may be in the form of signals generated by one or more sensors (not shown) monitoring each non-parasitic device 32, machine 10, and/or an external object, such as a hole or pile. Such signals may also be generated by a machine operator. For example, signals may be generated as an operator operates a control device (not shown), such as a joystick, steering wheel, or accelerator pedal in cab 12, to move implement 14, traction devices 16, and/or machine 10. Based on the inputs, each non-parasitic power request module 40 may generate a power request for the associated non-parasitic device 32.

Along with each non-parasitic power request, it is contemplated that each non-parasitic power request module 40 may generate a priority signal. The priority signals generated by non-parasitic power request modules 40 may indicate a priority among non-parasitic devices 32 for receiving the power generated by power source 20. A priority signal generated by a particular non-parasitic power request module 40 may include a priority level indicative of the importance of a power request, which may be determined based on criteria. For example, if the braking system (not shown) requests power for immediate use, the associated non-parasitic power request module 40 may assign a top level priority to the power request, to convey the importance of the power request. If a particular non-parasitic device 32 needs power for the purpose of protecting machine 10 from being damaged, or from experiencing excessive wear and tear, the associated non-parasitic power request module 40 may assign an intermediate level priority to the power request signal, to convey that the power request is of intermediate importance, or lesser importance than a top level priority power request. If a particular non-parasitic device 32 needs power for the purpose of improving or maintaining machine efficiency, the associated non-parasitic power request module 40 may assign a bottom level priority to the power request signal, to convey that the power request is of relatively low importance, or lesser importance that an intermediate level priority power request. The higher the priority level, the higher the probability that the amount of power requested will be provided.

Power distribution module 42 may directly or indirectly cause the distribution of the total power available from power source 20 among parasitic devices 30 and non-parasitic devices 32. The distribution may be based on the total power available, the power requests received from parasitic power request modules 38 and non-parasitic power request modules 40, and/or the priorities assigned to the power requests received from non-parasitic power request modules 40. For example, power distribution module 42 may obtain the total power available from power source 20 and calculate the total power requested by parasitic power request modules 38 to determine a net power available. The net power available may be the remaining power available for consumption by non-parasitic devices 32 after the parasitic power requests have been subtracted from the total power available from power source 20. Upon determining the net power available, power distribution module 42 may compare the total power requested by non-parasitic power request modules 40 to the net power available. If the net power available meets or exceeds the total power requested by non-parasitic power request modules 40, all non-parasitic devices 32 may receive the power requested. However, if the net available power is insufficient, power distribution module 42 may distribute the net available power-based on the magnitudes of the power requests from non-parasitic power request modules 40 and/or their assigned priorities.

Figure 3:
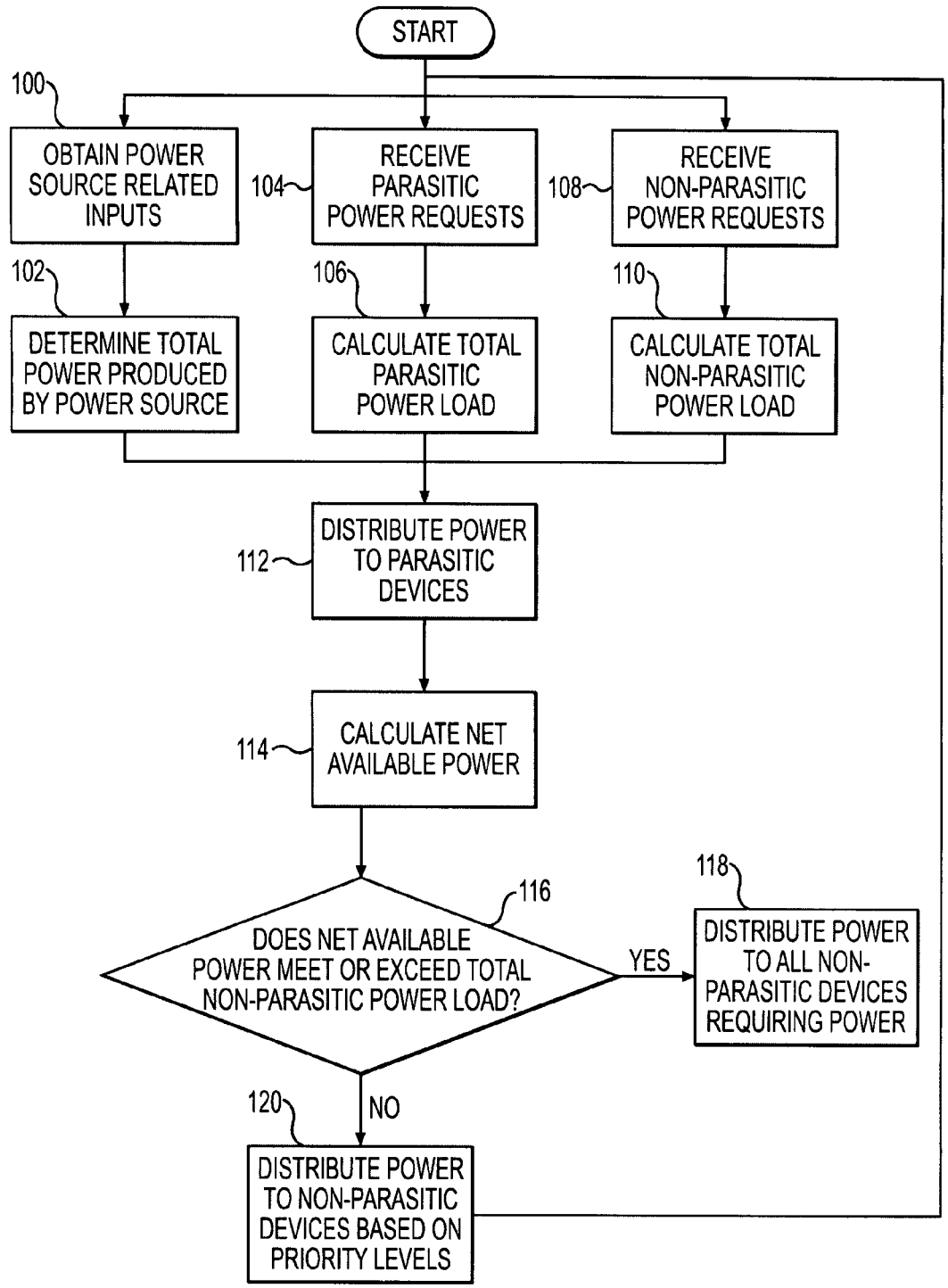
FIG. 3 is a flow diagram illustrating an exemplary method for distributing power to various systems of the exemplary machine of FIG. 1.

FIG. 3, which is discussed in the following section, illustrates the operation of power management system 18. In particular, FIG. 3 illustrates an exemplary method for distributing the power available from power source 20 among parasitic devices 30 and non-parasitic devices 32.

INDUSTRIAL APPLICABILITY

The disclosed power management system may adequately distribute power generated by an engine to various power consuming devices without causing the engine to stall or fail. In particular, the disclosed power management system may consider the parasitic devices requiring power and may prioritize power consuming requests when distributing the total available power among the non-parasitic power consuming devices. By considering the parasitic device power consumption and prioritizing the power requests from the non-parasitic devices, the disclosed power management system may prevent the total power demand from exceeding the total power available. The operation of power management system 18 will now be explained.

FIG. 3 illustrates a flow diagram depicting an exemplary method for distributing the total available power generated by power source 20. The method may begin with processes carried out by available power module 36. While performing one such process, available power module 36 may obtain engine related inputs (step 100). These inputs may be in the form of signals received from various sensors (not shown) indicative of parameters such as, for example, engine operating conditions, torque, power, capacity, and/or speed. Available power module 36 may use the received inputs to determine the total power that may be produced by power source 20 (step 102). The total power may be determined by comparing the received signals to various algorithms, maps, charts, and/or graphs. It should be understood that the total power that power source 20 may be capable of producing at any given time may depend on such factors as, for example, machine altitude, fuel quality, and/or engine speed.

Power distribution module 42 may receive power requests from parasitic power request modules 38 (step 104) and may sum the power requests to calculate the total parasitic power load (step 106). The power requests may be determined based on various signals generated by sensors (not shown) associated with parasitic devices 30. The generated signals may indicate parameters such as, for example, pressures, flow rates, current power usage, expected power usage, or any other parameter useful for determining if a parasitic device 30 requires power.

Power distribution module 42 may also receive power requests from non-parasitic power request modules 40 (step 108) and may sum the power requests to calculate the total non-parasitic power load (step 110). The power requests may be determined based on various signals generated by sensors (not shown) associated with non-parasitic devices 32. In addition, the generated signals may indicate parameters such as, for example, pressures, flow rates, current power usage, expected power usage, or any other parameter useful for determining if a non-parasitic device 32 requires power. Furthermore, each power request may include a priority level and may be based on the importance of the power request. For example, a brake system requires power for immediate use, the power request generated by the associated non-parasitic power request module 40 may be assigned a top level priority. In addition, a power request for a non-parasitic device 32 requiring power to prevent excessive wear and tear on machine 10 may be assigned and intermediate level priority. Furthermore, a power request for a non-parasitic device 32 requiring power for ordinary maintenance may be assigned a low level priority.

Power distribution device 42 may distribute or trigger the distribution of power to fulfill the requests of all parasitic power request modules 38 (step 112). After distributing or triggering the distribution of power to parasitic devices 30, power distribution device 42 may calculate a net available power (step 114) The net available power may be the available power remaining after all parasitic power requests have been fulfilled and may be determined by subtracting the total parasitic power load from the total available power calculated by available power module 36.

After calculating the net available power, power distribution module 42 may compare the net available power to the total non-parasitic power load to determine if the net available power meets or exceeds the total non-parasitic power load (step 116). If power distribution module 42 determines that the net available power meets or exceeds the total non-parasitic power load (step 116: Yes), power distribution module 42 may distribute or trigger the distribution of power to fulfill the requests of all non-parasitic power request modules 40 (step 118). After fulfilling the requests, steps 100, 104, and 108 may be repeated (i.e., available power module 36 may obtain engine related inputs and power distribution module 42 may receive power requests from parasitic and non-parasitic power request modules 38 and 40).

If power distribution module 42 determines that the net available power does not meet or exceed the total non-parasitic power load (step 116: No), power distribution module 42 may distribute or trigger the distribution of power to non-parasitic devices 32 based on each non-parasitic device priority level (step 120). For example, power distribution module 42 may distribute or trigger the distribution of power to those non-parasitic devices 32 having a top level priority and then compare the remaining available power to the remaining power requests in a manner similar to that disclosed in step 116. Such a procedure may be repeated for each level of priority until either all of the available power has been distributed or all power requests have been satisfied. After all of the available power has been distributed, steps 100, 104, and 108 may be repeated (i.e., available power module 36 may obtain engine related inputs and power distribution module 42 may receive power requests from parasitic and non-parasitic power request modules 38 and 40).

Distributing power among parasitic devices before distributing power among non-parasitic devices may permit an adequate distribution of power without having to adjust the engine speed. Moreover, the power consuming devices may be adequately powered while maintaining the engine at an optimal engine speed. Furthermore, because the engine speed may not need to be adjusted for adequate power distribution, the likelihood of engine failure when the engine is producing power at its maximum capacity may be reduced.

It will be apparent to those skilled in the art that various modifications and variations can be made in the disclosed system without departing from the scope of the disclosure. Other embodiments will be apparent to those skilled in the art from consideration of the specification disclosed herein. It is intended that the specification and examples be considered as exemplary only, with a true scope being indicated by the following claims and their equivalents.

What is claimed is:

1. A power distribution system, comprising:
 a power source configured to generate a power output;
 an available power module configured to determine a total available power generated by the power source;
 one or more parasitic power request modules configured to receive a request for power from an associated parasitic device;
 one or more non-parasitic power request modules configured to receive a request for power from an associated non-parasitic device; and
 a power distribution module configured to cause the distribution of power among the parasitic devices, determine a net available power indicative of a difference between the total available power and power distributed among the parasitic devices, and cause the distribution of power among the non-parasitic devices, the power distributed among the non-parasitic devices being the net available power.

2. The power distribution system of claim 1, wherein the one or more non-parasitic power request modules each have an associated priority.

3. The power distribution system of claim 1, wherein the power distribution module is configured to distribute the net available power among all of the non-parasitic devices requesting power when the total power requested by the non-parasitic devices is less than the net available power.

4. The power distribution system of claim 2, wherein the power distribution module is configured to distribute the net available power among the non-parasitic devices based on the priorities attached to the requests for power.

5. The power distribution system of claim 4, wherein the priorities include a top priority, an intermediate priority, and a bottom priority, and the power distribution device is configured to distribute power among all of the non-parasitic devices requesting power that have top priority before distributing power among non-parasitic devices requesting power that have intermediate priority or bottom priority.

6. The power distribution system of claim 1, wherein the parasitic devices include at least a compressor for an air conditioning unit, an axle oil cooler, an alternator, or a transmission pump.

7. The power distribution system of claim 6, wherein the non-parasitic devices include at least non-parasitic elements of a power train or an implement.

8. A method for distributing power, comprising:
 calculating a total available power;
 receiving one or more parasitic power requests, each request being associated with a parasitic device;
 receiving one or more non-parasitic power requests, each request being associated with a non-parasitic device;
 distributing the available power among the parasitic devices;
 calculating a net available power indicative of a difference between the total available power and power distributed among the parasitic devices; and
 distributing, to the non-parasitic devices, the net available power.

9. The method of claim 8, further including assigning a priority to each non-parasitic power request and distributing the net available power among the non- parasitic devices based on the assigned priorities.

10. The method of claim 9, wherein the priorities include a top priority, an intermediate priority, and a bottom priority.

11. The method of claim 10, further including distributing the net available power among all of the non-parasitic device requests having top priority before distributing power among non-parasitic power requests having intermediate priority or bottom priority.

12. The method of claim 8, further including calculating the total power requested by the non-parasitic devices and distributing the net available power among all of the non-parasitic devices requesting power when the total power requested by the non-parasitic devices is less than the net available power.

13. A machine, comprising:
 a power source configured to generate a power output;
 one or more traction devices;
 an implement;
 one or more parasitic devices;
 one or more non-parasitic devices; and
 a controller including:
  an available power module configured to determine a total available power generated by the power source;
  one or more parasitic power request modules configured to receive a request for power from an associated parasitic device, wherein each parasitic device is at least one of a compressor for an air conditioning unit, an axle oil cooler, an alternator, a transmission pump, or an emissions driven compressor;
  one or more non-parasitic power request modules configured to receive a request for power from an associated non-parasitic device, wherein each non-parasitic device is one of at least a non-parasitic element of a power train or an implement; and
  a power distribution module configured to distribute or cause the distribution of power among the parasitic devices, determine a net available power indicative of a difference between the total available power and the power distributed among the parasitic devices, and distribute or cause the distribution of power among the non-parasitic devices, the power distributed among the non-parasitic devices being the net available power.

14. The machine of claim 13, wherein the non-parasitic power request modules each have an associated priority.

15. The machine of claim 14, wherein the priorities include a top priority, an intermediate priority, and a bottom priority.

16. The machine of claim 13, wherein the power distribution module is configured to distribute the net available power among all of the non-parasitic devices requesting power when the total power requested by the non-parasitic devices is less than the net available power.

17. The machine of claim 16, wherein the power distribution module is configured to distribute the net available power among the non-parasitic devices based on the priorities attached to the requests for power.

* * * * *